United States Patent
Berger

[15] 3,660,724
[45] May 2, 1972

[54] POWER SUPPLY PROTECTIVE CONTROL

[72] Inventor: James K. Berger, Sherman Oaks, Calif.
[73] Assignee: Pioneer Magnetics, Inc., Santa Monica, Calif.
[22] Filed: Mar. 18, 1971
[21] Appl. No.: 125,546

[52] U.S. Cl. ................................317/16, 317/31, 321/2, 321/11
[51] Int. Cl. .......................................................H02h 3/20
[58] Field of Search ...................317/16, 31, 51; 321/2, 18, 321/11, 14

[56] References Cited

UNITED STATES PATENTS

| | | | |
|---|---|---|---|
| 3,366,866 | 1/1968 | King | 321/14 |
| 3,217,207 | 11/1965 | Webb | 317/51 |
| 3,408,553 | 10/1968 | Bishop | 321/18 X |
| 3,427,528 | 2/1969 | Custer | 321/18 |

*Primary Examiner*—James D. Trammell
*Attorney*—Jessup & Beecher

[57] ABSTRACT

An improved protective circuit provided by which a silicon controlled rectifier (SCR), or equivalent device, is switched into circuit with a power supply in the presence of excessive output voltage, so as to protect the electronic equipment which is normally energized by the power supply. The protective circuit of the invention is such that the silicon controlled rectifier is not subjected to excessive currents so that it need not be excessively large, and no heat sink is required in conjunction with the silicon controlled rectifier.

3 Claims, 1 Drawing Figure

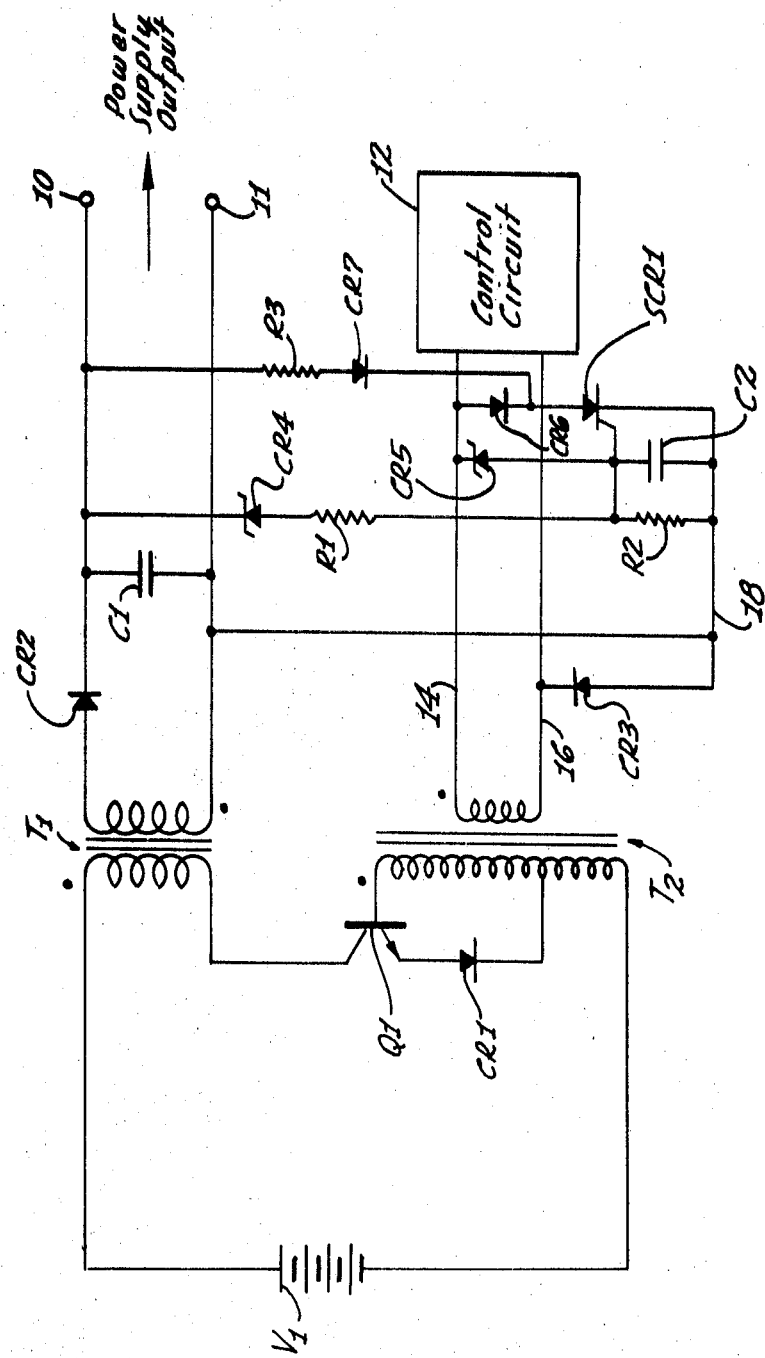

POWER SUPPLY PROTECTIVE CONTROL

BACKGROUND OF THE INVENTION

Copending application Ser. No. 58,042, filed July 270, in the name of the present inventor, is concerned with an improved type of power supply which has particular utility for energizing electronic equipment. The power supply described in the copending application is a regulated fly-back type in which electrical energy from an appropriate source is alternately stored in an electromagnetic device, such as a transformer, and then released into a load.

In power supplies of the type described in the copending application, for example, it is usual to connect a silicon controlled rectifier (SCR) directly across the output of the power supply, and the SCR is fired should the output voltage become excessively high to protect the electronic equipment which is energized by the power supply. The silicon controlled rectifier (SCR) provided in the prior art protective circuits must be large since it must handle extremely high currents, and it must be mounted on a large heat sink. This is because the protective SCR must be capable of withstanding the largest fault current that might occur.

As noted above, the objective of the present invention is to provide a means for connecting the silicon controlled rectifier (SCR), or an equivalent switching element, into the power supply circuit, so that it performs the desired protective function, as described above, and yet in a way that it does not encounter high currents, so that a small SCR may be used, and so that no heat sink is necessary. This is achieved in accordance with the invention, as will be described by controlling the transistor switch which connects the transformer to the input source by a separate transformer. Then, if a fault occurs, the SCR serves to block the input to the separate transformer so that the power supply cannot continue to operate until the fault has been corrected.

The circuit of the present invention, therefore, serves to move the protective SCR from the high power output circuit, in which it is connected in the prior art protective systems, back to a circuit point which does not have high power, but which has the property in that no component failure between that point and the output can produce an excessive output voltage. No such point exists in the usual type of series-regulator power supplies, but it does exist in the type of power supply described in the copending application, and in several other switching regulator type circuits. The present invention is predicated, therefore, on a principle in that the protective silicon controlled rectifier (SCR) is used to block the transformer input, rather than to absorb directly the excessive transformer output load current, when a fault occurs in the latter type of power supply circuit. It will be observed that when the protective circuit of the invention is applied to a power supply of the type described in the aforesaid copending application, no failure can occur which will allow energy to continue to be transferred to the load, one the protective SCR has been fired.

BRIEF DESCRIPTION OF THE DRAWING

The single FIGURE shows a circuit representative of one embodiment of the invention.

DETAILED DESCRIPTION OF THE ILLUSTRATED EMBODIMENT

In the illustrated circuit, a source of unidirectional potential designated V1 is connected to one side of the primary winding of a transformer T1 which constitutes the normal transformer of the power supply, and the other terminal of the source is connected to one side of the secondary winding of a control transformer T2. The other side of the secondary winding of the transformer T2 is connected to the base of a transistor Q1. The transistor Q1 may be an NPN transistor of the type presently designated DTS411. The emitter of the transistor Q1 is connected through a diode CR1 to a tap on the secondary winding of the transformer T2. The diode CR1 may be of the type designated 1N4721. The collector of the transistor Q1 is connected to the other side of the primary of the transformer T1. the secondary of the transformer T1 is connected through a diode CR2 to the output terminals 10, 11 of the power supply. A load filter capacitor C1 is connected across the terminals 10. The diode CR2 may be of the type designated 1N1184R. The capacitor C1 may have a capacity of 48,000 microfarads.

A control circuit 12 is connected to the primary winding of the transformer T2 by leads 14 and 16. The lead 16 is connected to a further lead 18 through a diode CR3. The diode CR3 may be of the type designated 1N4148. The lead 18 is connected to the output terminal 11. The output terminal 10 is connected to a Zener diode CR4 which, in turn, is connected through a resistor R1 to the gate electrode of a silicon controlled rectifier (SCR1). The Zener diode CR4 may be of the type designated 1N752. The resistor R1 may be have a resistance of 12 ohms.

The gate electrode of the silicon controlled rectifier (SCR1) is connected through a resistor R2 to the lead 18, and the cathode of the silicon controlled rectifier (SCR1) is directly connected to the lead 18. The resistor R2 is shunted by a capacitor C2. The resistor R2 may have a resistance of 100 ohms, and the capacitor C2 may have a capacity of 4.7 microfarads. The gate electrode of the silicon controlled rectifier (SCR1) is connected to the lead 14 through a Zener diode CR5, and the anode of the silicon controlled rectifier (SCR1) is connected to the lead 14 through a diode CR6. The Zener diode CR5 may be of the type designated 1N978, and the diode CR6 may be of the type designated 1N4148. An additional diode, CR7, and a resistor R3 may be connected with the resistor between the anode of CR7 and the output terminal 10, and the cathode of the anode to the anode of the SCR.

When the output voltage falls below a pre-established level, the control circuit 12 applies a pulse to the primary winding of the transformer T2 which causes the transistor Q1 to become conductive. Current then flows from the source V1 through the primary winding of the transformer T1, and through the transistor Q1 and diode CR1, and through the lower part of the secondary winding of the transformer T2, back to the source. This current stores energy in the transformer T1, since the transformer T1 has substantial inductive reactance.

When the stored energy is sufficient, the control circuit 12 essentially short-circuits the primary winding of the transformer T2 which removes the base current from the transistor Q1, causing the transistor Q1 to become non-conductive. The energy in the transformer T1 is now discharged through the diode CR2 into the load filter capacitor c1, thus producing the output voltage of the power supply. When the output voltage again decays to the present level, the cycle is repeated. In this way, the normal regulation of the output voltage of the power supply is accomplished.

In the prior art, it was usual to connect a silicon controlled rectifier protective device directly across the output terminals 10 and 11 of the power supply. Then, if the control circuit 12 should fail, and cause the output voltage to rise above the regulated level, the silicon controlled rectifier in the prior art system would be turned on, and it would absorb all the output current of the supply, thus protecting the electronic equipment normally energized by the power supply.

However, as pointed out, such a technique required that the silicon controlled rectifier (SCR1) be of relatively large power handling capabilities, and heat sinks were also required in conjunction with the silicon controlled rectifier (SCR1). However, in the circuit of the present invention, the silicon controlled rectifier (SCR1) is connected to the control transformer T2 so that when the silicon controlled rectifier (SCR1) is fired, the primary winding of the transformer T2 is essentially short circuited through SCR1, and through the diodes CR6 and CR3. This short circuit is unidirectional, so that the power transistor Q1 cannot be rendered conductive, although the transformer T2 is free to develop a voltage which further reverse biases the transistor Q1.

If SCR1 is turned on, there is no possible failure other than of the diodes CR3 or CR6, or of the silicon controlled rectifier (SCR1) itself, which would allow energy to be transferred from the source to the load. If the transistor Q1 fails open, no energy can be stored in the transformer T1. On the other hand, if the transistor Q1 fails shorted, the excessive primary current in the transformer T1 causes the short circuit to clear immediately by destruction of the interval connections in transistor Q1, thereby causing the transistor Q1 to become non-conductive.

Therefore, the load is protected when the silicon controlled rectifier (SCR1) is turned on, just as surely as if the silicon controlled rectifier (SCR1) were connected directly across the output of the power supply. However, the silicon controlled rectifier (SCR1) need handle only a small control current, as compared with the heavy output current which must be controlled by the protective silicon controlled rectifier in the prior art circuit. The diode CR6 allows the transformer winding to operate at high frequency during normal operation, without danger of accidental triggering of the silicon controlled rectifier SCR1 due to the rate of change of anode voltage. Diode CR7 is and resistor R3 provide a current path to enable the SCR to discharge capacitor C1, when the SCR is fired. The resistor R3 serves to limit the discharge current to a safe level.

In the circuit of FIG. 1, the diode CR4 is a Zener diode having a breakdown voltage slightly greater than the normal supply output voltage. If the supply output rises to the level of breakdown of the Zener diode CR4, current flows from the output through the diode CR4 and through the current limiting resistor R1, into the gate of the silicon controlled rectifier (SCR1), thereby firing the silicon controlled rectifier (SCR1). The resistor r2 and capacitor C2 form a filter network to prevent noise spikes from producing spurious firing of the silicon controlled rectifier (SCR1).

The illustrated circuit also serves to protect the power transistor Q1 from excessive current due to control failure, and also serves to protect the control circuit 12 from excessive voltage due to failure of the power transistor Q1. the Zener diode CR5 performs both these functions. Excessive current in the transistor Q1 will cause the base-emitter voltage of the transistor Q1, and the forward conduction voltage of the diode CR1 to become excessive. This will result in a voltage across the primary winding of the transformer t2 which exceeds the breakdown voltage of the Zener diode CR5. Current will then flow through the diode CR5 into the gate of the silicon controlled rectifier SCR1, causing the silicon controlled rectifier to fire, thereby shutting off the current in the power transistor Q1.

If the power transistor Q1 fails in a short circuiting condition, the primary current through the transformer T1 becomes excessive, and would result in a voltage on the primary winding of the transformer T2 which would damage the control circuit, except that before the voltage rises to dangerous level it exceeds the breakdown voltage of the Zener diode CR5, and turns on the silicon controlled rectifier SCR1. This causes the voltage to be clamped down to a few volts above the ground potential, and protects the control circuit from damage.

While a particular embodiment of the invention has been shown and described, modifications may be made. It is intended in the following claims to cover all such modifications as fall within the spirit and scope of the invention.

I claim:

1. A power supply circuit including: a first transformer having a primary winding and a secondary winding; a second transformer having a primary winding and a secondary winding; a unidirectional potential source connected to one side of the primary winding of said first transformer and to one side of the secondary winding of said second transformer; a switching transistor having a base electrode connected to the other side of the secondary winding of said second transformer, and a collector electrode connected to the other side of the primary of said first transformer, and an emitter electrode connected to a tap on the secondary winding of said second transformer; an output circuit connected to the secondary winding of said first transformer for developing an output voltage; a control circuit connected to the primary winding of the second transformer for cyclically controlling the conductivity of said transistor to maintain said output voltage at a predetermined regulated level; and a protective circuit including a silicon controlled rectifier connected across the primary winding of said second transformer to short circuit said last-named primary winding whenever said silicon controlled rectifier is fired so as to prevent said transistor from being rendered conductive, and said silicon rectifier having a gate electrode connected to said output circuit to cause said silicon controlled rectifier to fire whenever the output voltage exceeds a predetermined threshold.

2. The power supply circuit defined in claim 1, and which includes said gate electrode to determine the voltage level at a Zener diode interposed between said output circuit and said gate electrode to determine the voltage level at which said silicon controlled rectifier will fire.

3. The power supply circuit defined in claim 1, and which includes a Zener diode connected between the primary winding of said second transformer and the gate electrode of said silicon controlled rectifier to cause said silicon controlled rectifier to fire whenever the voltage across the last-mentioned primary winding exceeds a predetermined value.

* * * * *